(12) United States Patent
Chun et al.

(10) Patent No.: US 12,187,930 B2
(45) Date of Patent: Jan. 7, 2025

(54) CROSS-LINKABLE COMPOSITION

(71) Applicant: Shanjin Optoelectronics (Suzhou) Co., Ltd., Jiangsu (CN)

(72) Inventors: Sang Ki Chun, Daejeon (KR); Seul Gi Kang, Daejeon (KR)

(73) Assignee: Shanjin Optoelectronics (NANJING) Co., Ltd. (CN)

( * ) Notice: Subject to any disclaimer, the term of this patent is extended or adjusted under 35 U.S.C. 154(b) by 1104 days.

(21) Appl. No.: 16/959,273

(22) PCT Filed: Apr. 24, 2019

(86) PCT No.: PCT/KR2019/004943
§ 371 (c)(1),
(2) Date: Jun. 30, 2020

(87) PCT Pub. No.: WO2019/209022
PCT Pub. Date: Oct. 31, 2019

(65) Prior Publication Data
US 2021/0054242 A1     Feb. 25, 2021

(30) Foreign Application Priority Data

Apr. 25, 2018  (KR) .......................... 10-2018-0047793

(51) Int. Cl.
C09J 7/38      (2018.01)
B32B 7/12      (2006.01)
C08F 220/18    (2006.01)

(52) U.S. Cl.
CPC .............. *C09J 7/385* (2018.01); *B32B 7/12* (2013.01); *C08F 220/1804* (2020.02); *B32B 2457/20* (2013.01); *C08F 2800/20* (2013.01); *C08F 2810/20* (2013.01); *C09J 2203/326* (2013.01); *C09J 2301/302* (2020.08); *C09J 2433/00* (2013.01)

(58) Field of Classification Search
None
See application file for complete search history.

(56) References Cited

U.S. PATENT DOCUMENTS

2005/0165146 A1* 7/2005 Ilda ..................... C09J 133/04
                                                     524/356
2007/0087133 A1* 4/2007 Cho ..................... C09J 133/06
                                                     428/1.31
2013/0266805 A1   10/2013 Kataoka et al.
(Continued)

FOREIGN PATENT DOCUMENTS

CN    103361002 A    10/2013
CN    106467710 A     3/2017
(Continued)

OTHER PUBLICATIONS

International Search Report for Application No. PCT/KR2019/004943 mailed Aug. 2, 2019, 2 pages.
(Continued)

*Primary Examiner* — Samir Shah

(57) ABSTRACT

The present application relates to a cross-linkable composition. The present application can provide a cross-linkable composition without degradation of cross-linking efficiency while exhibiting conductivity by containing an ionic compound, and its use.

14 Claims, 1 Drawing Sheet

(56) References Cited

U.S. PATENT DOCUMENTS

2014/0147668 A1* 5/2014 Yamagata ............... C09J 7/385
 524/265
2021/0032435 A1 2/2021 Chun

FOREIGN PATENT DOCUMENTS

| | | |
|---|---|---|
| CN | 111051427 A | 4/2020 |
| EP | 2690148 A1 | 1/2014 |
| EP | 3020777 A1 | 5/2016 |
| EP | 3696227 A1 | 6/2019 |
| JP | 2008517137 A | 5/2008 |
| JP | 2009511705 A | 3/2009 |
| JP | 2013185007 A | 9/2013 |
| JP | 2013216756 A | 10/2013 |
| JP | 2013216768 A | 10/2013 |
| JP | 2014024993 A | 2/2014 |
| JP | 2015227394 A | 12/2015 |
| JP | 2016528357 A | 9/2016 |
| KR | 20070041238 A | 4/2007 |
| KR | 20130101987 A | 9/2013 |
| KR | 20130113372 A | 10/2013 |
| KR | 20140142127 A | 12/2014 |
| KR | 20170089410 A | 8/2017 |
| KR | 20170101774 A | 9/2017 |
| TW | 201510166 A | 3/2015 |
| WO | 2019117423 A1 | 6/2019 |

OTHER PUBLICATIONS

EPC Communication pursuant to Article 94(3) for family application EP19792882.3, by Examination Division of EPC on Mar. 31, 2023.

Chinese Search Report for Application No. 201980007059.4 dated May 17, 2021, pp. 1-3.

Extended European Search Report including Written Opinion for Application No. 19792882.3 dated Feb. 25, 2021, 7 pages.

* cited by examiner

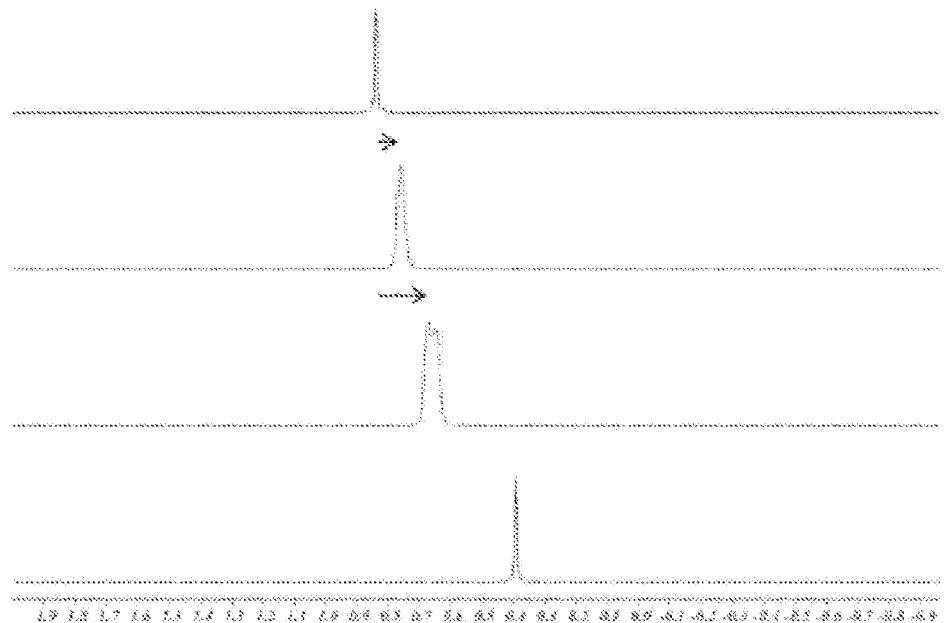

CROSS-LINKABLE COMPOSITION

CROSS-REFERENCE TO RELATED APPLICATIONS

This application is a national phase entry under 35 U.S.C. § 371 of International Application No. PCT/KR2019/004943 filed Apr. 24, 2019, which claims priority from Korean Patent Application No. 10-2018-0047793 filed Apr. 25, 2018, all of which are incorporated herein by reference.

TECHNICAL FIELD

The present application relates to a cross-linkable composition.

BACKGROUND ART

Cross-linked products of cross-linkable compositions such as pressure-sensitive adhesives or adhesives are used for various applications in various fields. For example, various optical films such as a polarizing plate are applied to a display device such as a liquid crystal display (LCD) or an organic light emitting diode (OLED), where most of the optical films are attached to the display device by a pressure-sensitive adhesive or an adhesive.

The pressure-sensitive adhesive is also applied to a surface protective film or the like for protecting an optical film applied to a display device.

When imparting conductivity to the pressure-sensitive adhesive or the adhesive in accordance with the application, it is typical that an ionic compound is blended to the pressure-sensitive adhesive or the adhesive.

DISCLOSURE

Technical Problem

The present application relates to a cross-linkable composition. It is one object of the present application to provide a cross-linkable composition capable of ensuring excellent cross-linking efficiency even when an ionic compound is blended in a cross-linkable composition.

Technical Solution

The present application relates to a cross-linkable composition. In the present application, the term "cross-linkable composition" may refer to a composition comprising a component capable of realizing a cross-linked structure in a chemical or physical method. The composition of the present application may comprise a component capable of realizing a cross-linked structure by a chemical method among the above methods.

The cross-linkable composition of the present application may be, for example, a pressure-sensitive adhesive composition or an adhesive composition. The term pressure-sensitive adhesive composition is a composition which can act as a pressure-sensitive adhesive before or after cross-linking, and the adhesive composition is a composition which can act as an adhesive before or after cross-linking. Here, the definitions of the pressure-sensitive adhesive and the adhesive follow definitions known in the art.

The cross-linkable composition may comprise an acrylic polymer. In the present application, the term "acrylic polymer" is a polymer containing, as a main component, a polymerized unit of an acrylic monomer. In the present application, the polymerized unit of a monomer means a structure that the relevant monomer forms in the polymer through a polymerization reaction. In the present application, the fact that a component B comprises the other component A as a main component may mean a case where the ratio of the component A in the component B is about 55 wt % or more, 60 wt % or more, 65 wt % or more, 70 wt % or more, 75 wt % or more, 80 wt % or more, 85 wt % or more, or about 90 wt % or more based on the total weight of the component B. The upper limit of the ratio is not particularly limited, which may be, for example, about 98 wt % or less, or 95 wt % or less.

In the present application, the term "acrylic monomer" means acrylic acid or methacrylic acid, or a derivative of acrylic acid or methacrylic acid such as acrylic acid ester or methacrylic acid ester. In addition, the term "(meth)acrylic" means acrylic or methacrylic.

The cross-linkable composition of the present application may comprise the acrylic polymer as a main component. When the composition is a solution containing water or an organic solvent, the ratio of the acrylic polymer as the main component may be based on the weight of the composition excluding the solvent.

The acrylic polymer may be a pressure-sensitive adhesive polymer or an adhesive polymer. The term "pressure-sensitive adhesive polymer" or "adhesive polymer" means a polymer whose physical properties such as its glass transition temperature are adjusted so that pressure-sensitive adhesive performance or adhesive performance can be exhibited before and/or after cross-linking. The construction of the above-described polymer is well known in the relevant field.

In one example, the acrylic polymer may comprise a polymerized unit of an alkyl (meth)acrylate monomer. Here, the alkyl (meth)acrylate may be a (meth)acrylate containing an alkyl group in the molecule. The alkyl group contained in the alkyl (meth)acrylate may be a branched alkyl group of linear chains and/or branched chains or a cyclic alkyl group having 1 to 20 carbon atoms, 1 to 16 carbon atoms, 1 to 12 carbon atoms, 1 to 8 carbon atoms or 4 to 8 carbon atoms. Also, the alkyl group may be optionally substituted by one or more substituents. Here, a specific example of the substituent may include halogen or alkyl, halogen or alkyl having 1 to 12 carbon atoms, chlorine, bromine, methyl, ethyl, propyl, butyl, nonyl or dodecyl, but is not limited thereto.

Such an alkyl (meth)acrylate can be exemplified by methyl (meth)acrylate, ethyl (meth)acrylate, n-propyl (meth)acrylate or isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, and the like, and one or two or more of these can be applied. Generally, n-butyl acrylate or 2-ethylhexyl acrylate, and the like is used.

The acrylic polymer may comprise a polymerized unit of the alkyl (meth)acrylate monomer as a main component.

The acrylic polymer may also be a cross-linkable polymer containing a cross-linkable functional group. The cross-linkable functional group can be introduced to the polymer by incorporating a unit of a monomer having a cross-linkable functional group (hereinafter, may be referred to as a cross-linkable monomer) into the polymer. Here, as the cross-linkable functional group, a hydroxyl group or a carboxyl group can generally be applied, and in the present application, it is suitable to apply a carboxyl group as a cross-linkable functional group.

The acrylic polymer may comprise no hydroxyl group or a small amount of a hydroxyl group as the cross-linkable functional group. For example, the acrylic polymer may comprise a polymerized unit of a monomer having a hydroxyl group in a ratio of about 10 wt % or less, 9 wt % or less, 8 wt % or less, 7 wt % or less, 6 wt % or less, 5 wt % or less, 4 wt % or less, 3 wt % or less, 2 wt % or less, 1 wt % or less, 0.5 wt % or less, 0.1 wt % or less, 0.05 wt % or less, or 0.01 wt % or less, or in a ratio of substantially 0 wt %.

Therefore, as the cross-linkable monomer, for example, a carboxyl group-containing monomer may be applied. The specific kind of each cross-linkable monomer is not particularly limited, and cross-linkable monomers known in the art can be used.

As the carboxyl group-containing monomer, (meth) acrylic acid, 2-(meth)acryloyloxyacetic acid, 3-(meth)acryloyloxypropyl acid, 4-(meth) acryloyloxybutyric acid, an acrylic acid dimer, itaconic acid, maleic acid and/or maleic anhydride, and the like can be used.

If necessary, as a hydroxyalkyl (meth)acrylate having a hydroxyalkyl group having a carbon number in a range of 1 to 12, a hydroxyl group-containing monomer, such as hydroxyethyl (meth)acrylate, 3-hydroxypropyl (meth)acrylate, 4-hydroxybutyl (meth)acrylate and/or 6-hydroxyhexyl (meth)acrylate, can also be used, but the content thereof may be suitably as small as possible.

The ratio of the polymerized unit of the cross-linkable monomer may be adjusted without particular limitation in consideration of the desired cohesive force or the like. However, in general, the cross-linkable polymer may comprise the polymerized unit of the cross-linkable monomer in a ratio in a range of about 0.01 to 10 parts by weight relative to 100 parts by weight of the polymerized unit of the alkyl (meth)acrylate monomer. In another example, the ratio of the polymerized unit of the cross-linkable monomer may be about 0.05 part by weight or more, 0.1 parts by weight or more, 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, or 5 parts by weight or more, and may also be about 9.5 parts by weight or less, 9 parts by weight or less, 8.5 parts by weight or less, 8 parts by weight or less, 7.5 parts by weight or less, 7 parts by weight or less, 6.5 parts by weight or less, or 6 parts by weight or less.

The cross-linkable polymer may further comprise, in addition to the polymerized unit of the above-mentioned monomer, a polymerized unit of another monomer, if necessary, and the kind thereof is not particularly limited. The polymerized unit of the monomer which may be further contained is a polymerized unit of an aromatic group-containing monomer, for example, a polymerized unit of an aromatic (meth)acrylate monomer. Such a unit may be used to obtain a so-called optical compensation effect, or may be applied for other reasons.

The kind of the aromatic group-containing monomer capable of forming such a polymerized unit is not particularly limited, and for example, a monomer represented by the following formula 6 can be applied.

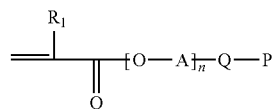

[Formula 6]

In Formula 6, $R_1$ represents hydrogen or an alkyl group, A represents an alkylene group, n represents an integer in a range of 0 to 3, Q represents a single bond, —O—, —S— or an alkylene group, and P represents an aryl group.

In Formula 6, the single bond means a case where atomic groups on both sides are directly bonded without mediating a separate atom. For example, in the structure represented by A-B-C, when B is a single bond, it may mean that no atom exists at the site represented by B, and A and C are directly linked to form a structure represented by A-C.

In Formula 6, $R_1$ may be, for example, hydrogen, or a methyl group or an ethyl group, which is an alkyl group having 1 to 4 carbon atoms, or may be hydrogen.

In Formula 6, A may be an alkylene group having 1 to 12 carbon atoms or 1 to 8 carbon atoms, and may be, for example, a methylene group, an ethylene group, a hexylene group or an octylene group. The alkylene group may be optionally substituted by one or more substituents.

In Formula 6, n may be, for example, a number in the range of 0 to 2, or may be 0 or 1.

In Formula 6, Q may be a single bond, —O— or —S—.

In Formula 6, P may be an aryl group having 6 to 20 carbon atoms, for example, a phenyl group, a biphenyl group, a naphthyl group or an anthracenyl group. In addition, the aryl group may be optionally substituted by one or more substituents.

In Formula 6, the aryl group may be optionally substituted by one or more substituents. Here, a specific example of the substituent may include halogen or alkyl, halogen or alkyl having 1 to 12 carbon atoms, chlorine, bromine, methyl, ethyl, propyl, butyl, nonyl or dodecyl, but is not limited thereto.

A specific example of the compound of Formula 6 may include one or a mixture of two or more of phenoxyethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, but is not limited thereto.

The ratio of the polymerized unit of the aromatic group-containing monomer can be controlled without limitation according to the application purpose. For example, the cross-linkable polymer may comprise about 0.1 to 45 parts by weight of the aromatic group-containing monomeric polymerized unit relative to 100 parts by weight of the alkyl (meth)acrylate unit. In another example, the ratio may be about 40 parts by weight or less, or 35 parts by weight or less, or 30 parts by weight or less.

The cross-linkable polymer may further comprise other known units in addition to the above-mentioned units, if necessary. In addition, the cross-linkable polymer can be produced by polymerization with a known polymerization method applied by the above-mentioned monomers.

The acrylic polymer may have a weight-average molecular weight (Mw) of 500,000 or more. In the present application, the term "weight average molecular weight" is a numerical value in terms of standard polystyrene measured by GPC (gel permeation chromatograph), which may also be simply referred to as molecular weight. In another example, the molecular weight (Mw) may be 600,000 or more, 700,000 or more, 800,000 or more, 900,000 or more, 1,000,000 or more, 1,100,000 or more, 1,200,000 or more, 1,300,000 or more, 1,400,000 or more, or 1,500,000 or more or so, and may be about 3,000,000 or less, about 2,800,000 or less, about 2,600,000 or less, about 2,400,000 or less, about 2,200,000 or less, or about 2,000,000 or less.

The cross-linkable composition comprises an ionic compound in addition to the polymer. By applying an ionic compound, appropriate conductivity can be imparted to the corsslinkable composition.

As the ionic compound, a known compound can be used. As the ionic compound, for example, a salt which is an ionic compound containing an alkali metal cation can be used. In one example, as the alkali metal cation, a lithium, sodium or potassium cation can be applied, and as a most suitable example, a lithium cation can be applied.

The kind of the anion contained in the ionic compound is not particularly limited. In one example, the anion may be $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4$), hexafluorophosphate ($PF_6^-$), methylbenzenesulfonate ($CH_3(C_6H_4)SO_3^-$), p-tolunesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) and/or trispentafluoroethyl trifluorophosphate ($P(C_2F_5)_3F_3^-$), and the like.

The ionic compound may also comprise an anion of the following formula 2 or bifluorosulfonylimide, and the like.

$$[X(YO_mR_f)_n]^-  \quad \text{[Formula 2]}$$

In Formula 2, X is a nitrogen atom or a carbon atom, Y is a carbon atom or a sulfur atom, $R_f$ is a perfluoroalkyl group, m is 1 or 2, and n is 2 or 3.

In Formula 2, when Y is carbon, m is 1, and when Y is sulfur, m is 2; and when X is nitrogen, n is 2; and when X is carbon, n is 3.

In Formula 2, $R_f$ may be a perfluoroalkyl group having 1 to 20 carbon atoms, 1 to 12 carbon atoms, 1 to 8 carbon atoms or 1 to 4 carbon atoms, where the perfluoroalkyl group may have a linear, branched or cyclic structure. The anion of Formula 2 may be a sulfonylmethide-based, sulfonylimide-based, carbonylmethide-based or carbonylimide-based anion. Specifically, the anion of Formula 2 may be one or a mixture of two or more of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanesulfonylimide or bispentafluoroethanecarbonylimide, and the like.

As the anion, an anion of any one of Formulas 3 to 5 below may also be applied.

$$[OSO_2C_nF_{2n+1}]^- \quad \text{[Formula 3]}$$

$$[N(SO_2C_nF_{2n+1})_2]^- \quad \text{[Formula 4]}$$

$$[C(SO_2C_nF_{2n+1})_3]^- \quad \text{[Formula 5]}$$

In Formulas 3 to 5, n is a number in a range of 0 to 4.

The anions of Formula 2 or bis(fluorosulfonyl)imide, or the anions of Formula 3 to 5 exhibit high electronegativity due to the perfluoroalkyl group ($R_f$) or the fluoro group, and also form unique resonance structures, thereby having hydrophobicity while forming weak bonds with cations. Accordingly, the ionic compound can impart a high antistatic property even in a small amount, while exhibiting excellent compatibility with other components of the composition such as a polymer.

The ratio of the ionic compound in the cross-linkable composition is not particularly limited, which may be adjusted to an appropriate range in consideration of the desired antistatic property or the like. In one example, the cross-linkable composition may comprise 0.001 to 20 parts by weight of the ionic compound per 100 parts by weight of the acrylic polymer. In another example, the ratio may be 0.005 parts by weight or more, 0.01 parts by weight or more, 0.05 parts by weight or more, 0.1 parts by weight or more, 0.5 parts by weight or more, 1 part by weight or more, 1.5 parts by weight or more, 2 parts by weight or more, 2.5 parts by weight or more, or 3 parts by weight or more, and may also be 18 parts by weight or less, 16 parts by weight or less, 14 parts by weight or less, 12 parts by weight or less, 10 parts by weight or less, 8 parts by weight or less, 6 parts by weight or less, 5 parts by weight or less, 4.5 parts by weight or less, or 4 parts by weight or less. Even when such an excessive amount of ionic compound is applied, the present application can solve the problem of lowering the cross-linking efficiency due to the ionic compound.

The cross-linkable composition further comprises, in addition to the above components, a compound of the following formula 1:

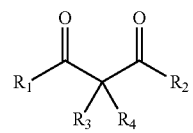

[Formula 1]

In Formula 1, $R_1$ to $R_4$ are each independently a hydrogen atom or an alkyl group.

As the alkyl group in Formula 1, for example, a linear, branched or cyclic alkyl group having 1 to 20 carbon atoms, 1 to 16 carbon atoms, 1 to 12 carbon atoms, 1 to 8 carbon atoms or 1 to 4 carbon atoms can be applied. For example, as the alkyl group in Formula 1 above, a methyl group or an ethyl group may also be applied.

The compound of Formula 1 may be variously applied as long as it has structures within the above-defined category. For example, a compound, wherein in Formula 1, $R_1$ and $R_2$ are each independently an alkyl group having 1 to 4 carbon atoms, such as a methyl group or an ethyl group, and $R_3$ and $R_4$ are each independently a hydrogen atom or an alkyl group having 1 to 4 carbon atoms, for example, a hydrogen atom, a methyl group or an ethyl group, may be used.

The $R_3$ and $R_4$ may all be hydrogen atoms, or at least one may be an alkyl group having 1 to 4 carbon atoms.

Here, the alkyl group may be optionally substituted by one or more substituents. Here, a specific example of the substituent may include halogen or alkyl, halogen or alkyl having 1 to 12 carbon atoms, chlorine, bromine, methyl, ethyl, propyl, butyl, nonyl or dodecyl, but is not limited thereto.

Such a compound is a component capable of improving the cross-linking efficiency of the cross-linkable composition. The present inventors have confirmed that when the cross-linkable composition contains an ionic compound, particularly a metal cation such as a lithium cation, the cation interacts with a cross-linking component, for example, a cross-linkable functional group of the acrylic polymer or a cross-linking agent, which is described below, to deteriorate the cross-linking efficiency. Therefore, in order to improve the cross-linking efficiency of the cross-linkable composition containing an ionic compound, it is necessary that the metal cation does not inhibit the cross-linking action. The present inventors have confirmed that the compound of Formula 1 can form structurally a complex with the metal cation, thereby realizing a system in which the cation does not interfere with the cross-linking action.

Some of compounds having structures belonging to the category of the compound of Formula 1 above may be applied to a cross-linkable composition such as a pressure-sensitive adhesive composition as a so-called cross-linking retarder. However, in the present application, the compound is not applied as the cross-linking retarder, but is used as a component for accelerating cross-linking, so to speak.

The system utilizing the relevant component as a cross-linking retarder is generally a system comprising a cross-linking agent of metal chelate series or a metal-containing cross-linking catalyst like metal chelate series. In addition, a compound having the structure of Formula 1 above may be applied together with the cross-linking agent or the cross-linking catalyst. In such a system, the compound acts to retard cross-linking through interaction with at least some of the components of the cross-linking agent or cross-linking catalyst. However, in the present application, the compound of Formula 1 above is applied to a system for inhibiting the function of a component that interrupts cross-linking. Particularly, in the present application, a system for applying the above compound so as to be capable of performing an action of preventing degradation of cross-linking efficiency is controlled when the cross-linking functional group of the acrylic polymer is a carboxyl group and an epoxy compound or an aziridine compound is applied as a cross-linking agent.

Therefore, the cross-linkable composition of the present application does not contain a metal chelate cross-linking agent and/or a metal-containing cross-linking catalyst. When the metal chelate cross-linking agent and/or the metal-containing cross-linking catalyst is applied together with the compound of Formula 1 above, the effect of improving the cross-linking efficiency as intended in the present application is hardly exerted. The compound of Formula 1 above can also act to further facilitate the dissociation of the ionic compound so that the cross-linkable composition can ensure conductivity more smoothly.

The ratio of the compound of Formula 1 in the cross-linkable composition is not particularly limited. However, from the viewpoint capable of solving degradation of cross-linking efficiency of the cross-linkable composition, an appropriate ratio can be controlled depending on the ratio of the ionic compound which is a component to induce the cross-linking efficiency degradation.

In one example, the cross-linkable composition may comprise the compound of Formula 1 above in a ratio of about 0.01 to 30 parts by weight relative to 100 parts by weight of the ionic compound. In another example, the ratio of the compound of Formula 1 above may be about 0.05 parts by weight or more, 0.1 parts by weight or more, 0.5 parts by weight or more, 0.7 parts by weight or more, 0.75 parts by weight or more, 0.9 parts by weight or more, about 1 part by weight or more, 1.5 parts by weight or more, 2 parts by weight or more, 2.5 parts by weight or more, 3 parts by weight or more, 3.5 parts by weight or more, or 4 parts by weight or more, or may be about 25 parts by weight or less, 20 parts by weight or less, 15 parts by weight or less, or 5 parts by weight or less. In one example, the ratio may also be changed appropriately according to its purpose.

In one example, the cross-linkable composition of the present application can realize high cross-linking efficiency with a small amount of cross-linking agent even in a state of containing a large amount of ionic compound. As described above, the inventors of the present invention have confirmed that the ionic compound contained in the cross-linkable composition is an element that inhibits cross-linking. Therefore, in order to secure high cross-linking efficiency, it is necessary to minimize the amount of the ionic compound or to increase the amount of the cross-linking agent. However, when the amount of the ionic compound is reduced, it is difficult to secure the desired conductivity, and if a large amount of cross-linking agent is used, it is not easy to secure the desired physical properties. However, the cross-linkable composition of the present application can ensure a high curing rate even with a small amount of cross-linking agent even when a large amount of ionic compound exists by using the above-mentioned specific system, that is, the compound of Formula 1, and excluding the conditions that the compound can act as a cross-linking retarder.

Therefore, in one example, the cross-linkable composition of the present application may have a curing rate of 30% or more according to the following equation 1:

$$\text{Curing rate} = B/A \times 100 \qquad \text{[Equation 1]}$$

In Equation 1, A is a mass (unit: g) before immersing the cross-linkable composition, in which a cross-linking agent of the acrylic polymer is blended, in an amount of 1 part by weight or less relative to 100 parts by weight of the acrylic polymer, to the cross-linkable composition comprising the ionic compound in a ratio of 3 parts by weight or more relative to 100 parts by weight of the acrylic polymer, or a cross-linked product of the composition in ethyl acetate, and B is a dry mass (unit: g) of insoluble contents recovered after immersing the cross-linkable composition or the cross-linked product of the composition in ethyl acetate at room temperature for 24 hours, where the insoluble contents are components sieved by a sieve of 200 meshes.

The term dry mass of insoluble contents is a mass in a state substantially free of solvent (for example, ethyl acetate), which is a mass in a state where the content of the solvent is about 10 wt % or less, 9 wt % or less, 8 wt % or less, 7 wt % or less, 6 wt % or less, 5 wt % or less, 4 wt % or less, 3 wt % or less, 2 wt % or less, 1 wt % or less, 0.5 wt % or less, 0.1 wt % or less, 0.05 wt % or less, or 0.01 wt % or less, or substantially 0 wt %. The condition for removing the solvent from the insoluble contents to measure the dry mass is not particularly limited, and for example, the drying process at an appropriate temperature may be performed in consideration of a volatilizing point of a solvent to be removed, or the like.

In another example, the ratio of the ionic compound blended to the cross-linkable composition at the time of determining the curing rate of Equation 1 may be about 3 parts by weight to 4 parts by weight or about 3.5 parts by weight to 4 parts by weight relative to 100 parts by weight of the acrylic polymer.

Also, the ratio of the cross-linking agent blended in the cross-linkable composition at the time of determining the curing rate of Equation 1 may be about 1 part by weight or less, 0.5 parts by weight or less, 0.1 parts by weight or less, 0.05 parts by weight or less, or 0.04 parts by weight or less or so, relative to 100 parts by weight of the acrylic polymer and the lower limit of the ratio may be about 0.01 parts by weight or more, 0.02 parts by weight or more, or 0.03 parts by weight or more.

Furthermore, the kind of the ionic compound and the cross-linking agent to be blended for confirmation of Equation 1 above is not particularly limited and they may be an ionic compound and a cross-linking agent to be actually used for applying the cross-linkable composition.

The ratio of the ionic compound and the ratio of the cross-linking agent in Equation 1 are a measure showing that the cross-linkable composition of the present application can realize a high curing rate with a small amount of cross-linking agent even in a state where a large amount of ionic compound exists. That is, the ratios of the ionic compound and the cross-linking agent in Equation 1 do not mean that the ionic compound and the cross-linking agent are contained in the ratios in the state where the cross-linkable composition is actually used. Therefore, for example, even if a cross-linking composition or a cross-linked product thereof contains the ionic compound and the cross-linking agent in ratios other than the ratios in Equation 1 above, such a cross-linkable composition falls within the scope of the present application in the case of exhibiting the above-described curing rate when the ionic compound and the cross-linking agent have been controlled to the ratios of Equation 1 above.

In one example, the curing rate of Equation 1 above may be about 35% or more, or about 40% or more, or may be about 45% or more, 50% or more, 55% or more, 60% or more, 65% or more, 70% or more, or 75% or more, where the upper limit of the ratio is not limited, but may be about 100% or less, about 95% or less, about 90% or less, or about 85% or less.

Also, the cross-linkable composition may further comprise a cross-linking agent. The cross-linking agent may be a component that cross-links the acrylic polymer.

As the cross-linking agent, a known cross-linking agent can be used without any particular limitation. As the cross-linking agent, for example, an isocyanate cross-linking agent, an epoxy cross-linking agent or an aziridine cross-linking agent can be used. In particular, the cross-linkable composition of the present application can exert a suitable effect when the cross-linkable functional group of the polymer contained in the composition is a carboxyl group and the cross-linking agent is an epoxy or aziridine series among the above types.

The type of cross-linking agent applied in the present application is not particularly limited. For example, as the isocyanate cross-linking agent, a diisocyanate such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a reaction product of one or more of the diisocyanates with a polyol (e.g., trimethylol propane), and the like can be used. Also, as the epoxy cross-linking agent, for example, one or more selected from the group consisting of ethylene glycol diglycidyl ether, triglycidyl ether, trimethylolpropane triglycidyl ether, N,N,N',N'-tetraglycidylethylenediamine and glycerin diglycidyl ether can be used. Then, as the aziridine cross-linking agent, for example, N,N-toluene-2,4-bis(1-aziridinecarboxamide), N,N'-diphenylmethane-4,4'-bis(1-aziridinecarboxamide), triethylenemelamine, bisisophthaloyl-1-(2-methylaziridine) and tri-1-aziridinylphosphine oxide can be used.

The cross-linkable composition of the present application may comprise the cross-linking agent in an amount of 10 parts by weight or less, or 0.001 parts by weight to 10 parts by weight, relative to 100 parts by weight of the acrylic polymer. Under this ratio, it is possible to prevent deterioration of endurance reliability such as occurrence of inter-layer peeling or a lifting phenomenon while maintaining cohesive force of the cross-linked product appropriately. In another example, the ratio of the cross-linking agent may be about 0.005 parts by weight or more, 0.01 parts by weight or more, or 0.02 parts by weight or more, and may be about 9 parts by weight or less, 8 parts by weight or less, 7 parts by weight or less, 6 parts by weight or less, 5 parts by weight or less, 4 parts by weight or less, 3 parts by weight or less, 2 parts by weight or less, 1.5 parts by weight or less, 1 part by weight or less, 0.5 parts by weight or less, 0.4 parts by weight or less, 0.3 parts by weight or less, 0.2 parts by weight or less, 0.1 parts by weight or less, or 0.05 parts by weight or less.

The cross-linkable composition may further comprise other known additives as needed, in addition to the above-mentioned components. Such an additive can be exemplified by one or more selected from the group consisting of a coupling agent such as a silane coupling agent, an antistatic agent, a tackifier, a ultraviolet stabilizer; an antioxidant; a colorant; a reinforcing agent; a filler; a defoamer; a surfactant; a photopolymerizable compound such as a multifunctional acrylate; and a plasticizer, but is not limited thereto.

Such a cross-linkable composition can be applied to various applications. In one example, the cross-linkable composition can be applied to forming a pressure-sensitive adhesive layer in a pressure-sensitive optical laminate or a surface protective film, and the like.

Thus, the present application may relate to, for example, an optical laminate or a surface protective film.

Here, the optical laminate may comprise an optical film; and a pressure-sensitive adhesive layer, which is a cross-linked product of the cross-linkable composition, formed on one side of the optical film. In the case of a surface protective film, it may comprise a protective base film; and a pressure-sensitive adhesive layer, which is a cross-linked product of the cross-linkable composition, formed on one side of the base film.

Here, the constitution contained in the optical laminate or the surface protective film, for example, the type of the optical film or the protective substrate film is not particularly limited and a known constitution can be used.

For example, as the optical film included in the optical laminate, various types used in various display devices may be applied. For example, the optical film may be a polarizing plate, a polarizer, a polarizer protective film, a retardation film, a viewing angle compensation film or a luminance enhancement film, and the like. In this specification, the term polarizer and polarizing plate refers to subjects that are distinguished from each other. The polarizer refers to a film, sheet or element itself exhibiting a polarization function, and the polarizing plate means an optical element including other elements together with the polarizer. Other elements that can be included in the optical element together with the polarizer can be exemplified by a polarizer protective film or a retardation layer, and the like, but is not limited thereto.

Basically, the polarizer that can be included in the optical film of the present application is not particularly limited. For example, as the polarizer, a polyvinyl alcohol polarizer can be used. The term polyvinyl alcohol polarizer may mean, for example, a resin film of polyvinyl alcohol (PVA) series containing an anisotropic absorbent material such as iodine or a dichroic dye. For example, the polarizer can be produced by a method of incorporating an anisotropic absorbent material into a polyvinyl alcohol-based resin film and orienting the anisotropic absorbent material by stretching or the like. Here, the polyvinyl alcohol-based resin may include polyvinyl alcohol, polyvinyl formal, polyvinyl acetal or a saponified product of ethylene-vinyl acetate copolymer, and the like. The degree of polymerization of the polyvinyl alcohol-based resin may be 100 to 5,000 or 1,400 to 4,000 or so, but is not limited thereto.

The polyvinyl alcohol polarizer can be produced, for example, by performing at least a dyeing process, a cross-linking process and a stretching process on a PVA-based film. In the dyeing step, the cross-linking step and the stretching step, respective treating baths of a dyeing bath, a cross-linking bath and a stretching bath are each used, wherein these respective treating baths, a treating solution according to each process can be used.

In the dyeing process, the anisotropic absorbent material can be adsorbed and/or oriented on the PVA-based film. Such a dyeing process can be performed together with the stretching process. The dyeing can be performed by immersing the film in a solution containing an anisotropic absorbent material, for example, an iodine solution. As the iodine solution, for example, an aqueous solution or the like containing iodine, and iodine ions by an iodinated compound as a dissolution aid may be used. As the iodinate compound, for example, potassium iodide, lithium iodide, sodium iodide, zinc iodide, aluminum iodide, lead iodide, copper iodide, barium iodide, calcium iodide, tin iodide or titanium iodide, and the like may be used. The concentration of iodine and/or iodine ions in the iodine solution can be adjusted in consideration of the desired optical characteristics of the polarizer, and such an adjustment method is known. In the dyeing process, the temperature of a solution comprising an anisotropic absorbent material such as an iodine solution is usually 20° C. to 50° C. or 25° C. to 40° C. or so, and the immersion time is usually 10 seconds to 300 seconds or 20 seconds to 240 seconds or so, but is not limited thereto.

The cross-linking process can be performed, for example, using a cross-linking agent such as a boron compound. The order of the cross-linking process is not particularly limited. For example, the cross-linking process can be performed together with the dyeing process and/or drawing process or can be performed separately from the process. The cross-linking process may also be performed several times. As the boron compound, boric acid or borax, and the like may be used. The boron compound can be generally used in the form of an aqueous solution or a mixed solution of water and an organic solvent. Usually, as the boron compound, an aqueous solution of boric acid is used. The boric acid concentration in the boric acid aqueous solution can be adjusted in an appropriate range in consideration of the degree of cross-linking of the PVA-based film and the resulting heat resistance, and the like. Also, the cross-linking agent may further comprise an iodinated compound such as potassium iodide.

The cross-linking process can be performed by immersing the PVA-based film in an aqueous boric acid solution or the like. At this time, the temperature of the aqueous boric acid solution and/or the immersion temperature is usually in a range of 25° C. or higher, 30° C. to 85° C. or 30° C. to 60° C. or so and the immersion time is usually 5 seconds to 800 seconds or 8 seconds to 500 seconds or so, but is not limited thereto.

The stretching process is generally performed by uniaxial stretching. The stretching process may also be performed together with the dyeing and/or cross-linking process. The stretching method is not particularly limited, and for example, as the stretching method, a wet stretching method can be applied. In such a wet stretching method, for example, the stretching process is generally performed after dyeing the PVA-based film, but the stretching process may be performed with cross-linking, and may also be performed several times or in multiple stages.

The treatment liquid applied to the wet stretching method may comprise, for example, an iodinated compound such as potassium iodide. In this process, a light blocking rate can also be controlled by adjusting the ratio of the iodinated compound or the like. At this time, the temperature of the treatment liquid and/or the treatment bath is usually in the range of 25° C. or higher, 30° C. to 85° C. or 50° C. to 70° C., and the treatment time is usually 10 seconds to 800 seconds or 30 seconds to 500 seconds, without being limited thereto.

In the stretching process, the total draw ratio of the PVA-based film can be controlled in consideration of orientation characteristics of the polarizer and the like. For example, the total draw ratio may be 3 times to 10 times, 4 times to 8 times or 5 times to 7 times or so based on the original length of the PVA-based film, but is not limited thereto. Here, in the case of performing stretching in a swelling process or the like other than the stretching process, the total draw ratio may mean the cumulative draw ratio including the stretching in each process. Such a total draw ratio can be adjusted to an appropriate range in consideration of orientation characteristics, processability or stretching cuttability of the polarizer, and the like.

In the production process of the polarizer, in addition to the dyeing, cross-linking and stretching, the swelling process may also be performed before performing the above processes. The contamination of the surface of the PVA-based film or other components such as an antiblocking agent can be cleaned by the swelling process, and there is also an effect capable of reducing dyeing deviations of the polarizer or the like by the swelling process to produce a uniformly dyed polarizer.

In the swelling process, water, distilled water or pure water, and the like can be usually used. The main component of the treatment liquid used in the swelling process is water, and if necessary, an iodinated compound such as potassium iodide or an additive such as a surfactant, or an alcohol, and the like can also be included in a small amount. In this process, the above-described light blocking rate can also be controlled by controlling process variables.

The temperature of the treatment liquid used in the swelling process and/or the treatment temperature of the swelling process is usually 20° C. to 45° C. or 20° C. to 40° C. or so, but is not limited thereto. Since swelling deviations can cause dyeing deviations, process variables can also be adjusted so that the occurrence of such swelling deviations is suppressed as much as possible.

If necessary, appropriate stretching can also be performed in the swelling process. The draw ratio may be 6.5 times or less, 1.2 to 6.5 times, 2 times to 4 times, or 2 times to 3 times, based on the original length of the PVA-based film. The stretching in the swelling process can be controlled so that the draw ratio in the stretching process performed after the swelling process is small, and it can be controlled so that the stretching failure of the film does not occur.

In the production process of the polarizer, metal ion treatment can be performed. The metal ion treatment is performed, for example, by immersing the PVA-based film in an aqueous solution containing a metal salt. This allows metal ions to be contained in the polarizer, and in this process, the color tone of the PVA-based polarizer can be controlled by controlling the kind or ratio of metal ions. The applicable metal ions can be exemplified by metal ions of a transition metal such as cobalt, nickel, zinc, chromium, aluminum, copper, manganese or iron, and it may also be possible to control the color tone of the PVA-based polarizer by selecting an appropriate type of these.

In the production process of the polarizer, the cleaning process may proceed after dyeing, cross-linking and stretching. The cleaning process can be performed by a solution of an iodinated compound such as potassium iodide. In this process, the above-described light blocking rate can also be controlled through the control of the concentration of the iodinated compound in the solution or the treatment time of the cleaning process, and the like. Therefore, the concentration of the iodinated compound and the treatment time with the solution can be adjusted in consideration of the light blocking rate. In another example, the cleaning process may also be performed using water.

Such cleaning with water and cleaning with the iodinated compound solution may also be combined. Also, in the cleaning, a solution in which a liquid alcohol such as methanol, ethanol, isopropyl alcohol, butanol or propanol is blended may also be used.

The polarizer can be produced by performing the above-described processes and then performing a drying process. The drying process can be performed at an appropriate temperature for an appropriate time, for example, in consideration of the moisture content and the like required for the polarizer, where the conditions are not particularly limited.

In one example, as the polarizer, a polyvinyl alcohol polarizer comprising a potassium component such as potassium ions and a zinc component such as zinc ions may be used for securing durability, particularly high temperature reliability, of the optical laminate. The optical laminate using the polarizer containing such components can maintain durability stably even under high temperature conditions, particularly ultra-high temperature conditions of 100° C. or higher.

The ratio of the potassium and zinc components can be further controlled. For example, in one example, the ratio (K/Zn) of the potassium component (K) to the zinc component (Zn) contained in the polyvinyl alcohol polarizer may be in a range of 0.2 to 6. In another example, the ratio (K/Zn) may be about 0.4 or more, about 0.6 or more, about 0.8 or more, about 1 or more, about 1.5 or more, about 2 or more, about 2.5 or more, about 3 or more, about 3.5 or more, or about 4.5 or more, and may be 5.5 or less, or about 5 or less.

In addition, the polyvinyl alcohol polarizer may comprise potassium in a ratio of about 0.1 to 2 wt % based on the total weight of the polyvinyl alcohol polarizer. In another example, the ratio of the potassium component may be about 0.15 wt % or more, about 0.2 wt % or more, about 0.25 wt % or more, about 0.3 wt % or more, about 0.35 wt % or more, 0.4 wt % or more or about 0.45 wt % or more, about 0.5 wt % or more, 0.55 wt % or more, about 0.6 wt % or more, about 0.65 wt % or more, about 0.7 wt % or more, about 0.75 wt % or more, or about 0.8 wt % or more, and may be about 1.95 wt % or less, about 1.9 wt % or less, about 1.85 wt % or less, about 1.8 wt % or less, about 1.75 wt % or less, about 1.7 wt % or less, about 1.65 wt % or less, about 1.6 wt % or less, about 1.55 wt % or less, about 1.5 wt % or less, about 1.45 wt % or less, about 1.4 wt % or less, about 1.35 wt % or less, about 1.3 wt % or less, about 1.25 wt % or less, about 1.2 wt % or less, about 1.15 wt % or less, about 1.1 wt % or less, about 1.05 wt % or less, about 1 wt % or less, about 0.95 wt % or less, about 0.9 wt % or less, or about 0.85 wt % or less, or about 0.8 wt % or less.

Then, the polyvinyl alcohol polarizer may comprise zinc in a ratio of 0.1 to 0.5 wt % based on the total weight of the polyvinyl alcohol polarizer. In another example, the ratio of the zinc component may be 0.11 wt % or more, 0.12 wt % or more, 0.13 wt % or more, 0.14 wt % or more, 0.15 wt % or more, 0.16 wt % or more, or 0.17 wt % or more, and may be 0.45 wt % or less, 0.4 wt % or less, 0.35 wt % or less, 0.3 wt % or less, 0.25 wt % or less, or 0.2 wt % or less.

In one example, the polyvinyl alcohol polarizer may comprise a potassium component and a zinc component in a ratio that satisfies the following equation A:

$$0.70 \leq 1/(1+Q \times d/R) \leq 0.95 \qquad \text{[Equation A]}$$

In Equation A, Q is the ratio (K/Zn) of the molar mass (K, 39.098 g/mol) of the potassium component and the molar mass (Zn, 65.39 g/mol) contained in the polyvinyl alcohol polarizer, d is the thickness (m)/60 m of the polyvinyl alcohol polarizer before stretching, R is the ratio (K/Zn) of the content (K, unit: weight %) of the potassium component and the content (Zn, unit: weight %) of the zinc component contained in the polyvinyl alcohol polarizer.

The polarizer comprising potassium and zinc components in the polarizer in such a form can have excellent reliability at high temperatures.

The thickness of such a polarizer is not particularly limited, where the polarizer may be formed to have an appropriate thickness depending on the purpose of applying the polarizer. Typically, the thickness of the polarizer may be in a range of 5 m to 80 m, but is not limited thereto.

The present application may also relate to a display device comprising such an optical laminate. The device may comprise, for example, a display panel to which the optical laminate is attached via the above-mentioned pressure-sensitive adhesive layer. Here, the type of the display panel is not particularly limited, which may be, for example, a known LCD panel or OLED panel, and the like. Furthermore, the position or the like where the optical laminate is attached to the panel can also follow a known manner.

Advantageous Effects

The present application relates to a cross-linkable composition. The present application can provide a cross-linkable composition without degradation of cross-linking efficiency while exhibiting conductivity by containing an ionic compound, and its use.

BRIEF DESCRIPTION OF DRAWINGS

The FIGURE is a view showing the NMR measurement results for confirming the effect of the present application.

BEST MODE

Hereinafter, the present application will be specifically described by way of examples, but the scope of the present application is not limited by the following examples.

1. Measurement Method of Curing Rate

The curing rate was evaluated through a gel fraction. After cross-linkable compositions prepared in Examples or Comparative Examples were each coated to an appropriate thickness, it was maintained at a temperature of about 120° C. for 3 minutes or so. Subsequently, it was again maintained at a temperature of 50° C. for 3 days to form a cross-linked layer, and then the relevant cross-linked layer was maintained in a constant temperature and humidity room (a temperature of 23° C., 50% relative humidity) for 7 days. Thereafter, about 0.2 g (=A in the gel fraction determination equation) was collected from the cross-linked layer. The collected cross-linked product was completely immersed in 50 mL of ethyl acetate and then stored in a dark room at room temperature for 1 day. Subsequently, a portion that was not dissolved in ethyl acetate (insoluble content) was collected in a #200 stainless steel wire net, which was dried at 150° C. for 30 minutes to measure the mass (dry mass of insoluble contents=B in the gel fraction measurement equation). Subsequently, the gel fraction (unit: %) was determined by substituting the measurement result into the following equation.

Gel fraction=B/A×100   <Gel fraction determination equation>

A: mass (0.2 g) of the pressure-sensitive adhesive
B: dry mass of insoluble contents (unit: g)

2. Surface Resistance Measurement Method

The surface resistance was confirmed by a probe method using a surface resistance meter from Mitsubishi. Also, the high temperature surface resistance was evaluated in the above manner after the cross-linked layer was maintained at a temperature of 80° C. for about 120 hours. Then, the moist-heat resistant surface resistance was evaluated in the above manner after the cross-linked layer was maintained at a temperature of 60° C. and 90% relative humidity for about 240 hours.

3. NMR Measurement Method

NMR was confirmed by Li NMR using a Bruker 500 MHz NMR instrument.

Preparation Example 1. Preparation of Pressure-Sensitive Adhesive Polymer (A)

To an 1 L reactor in which a nitrogen gas was refluxed and a cooling apparatus was installed for easy temperature control, n-butyl acrylate (n-BA) and acrylic acid (AA) were introduced in a weight ratio of 95:5 (n-BA: AA), and 100 parts by weight of ethyl acetate (EAc) was introduced thereto as a solvent. Subsequently, after the nitrogen gas was purged for 1 hour in order to remove oxygen, 0.03 parts by weight of azobisisobutyronitrile (AIBN) diluted in ethyl acetate to a concentration of 50 wt % was introduced thereto as a reaction initiator and reacted for 8 hours to prepare a copolymer (A) having a molecular weight (Mw) of about 1,800,000 or so.

Example 1

An epoxy cross-linking agent (T-743L, Soken Co., Japan) was combined with the copolymer (A) of Preparation Example 1 in a ratio of about 0.037 parts by weight relative to 100 parts by weight of the solid content of the copolymer (A), LiTFSI (lithium bis(trifluoromethanesulfonylimide) as an ionic compound was combined in a ratio of about 0.74 parts by weight relative to 100 parts by weight of the solid content of the copolymer (A), and then acetylacetone was again combined in a ratio of about 0.03 parts by weight relative to 100 parts by weight of the solid content of the copolymer (A) to prepare a cross-linkable composition.

Example 2

A cross-linkable composition was prepared in the same manner as in Example 1, except that the contents of the ionic compound and acetylacetone were changed to about 3.7 parts by weight and 0.03 parts by weight, respectively, relative to 100 parts by weight of the solid content of the copolymer (A).

Example 3

A cross-linkable composition was prepared in the same manner as in Example 1, except that the contents of the ionic compound and acetylacetone were changed to about 3.7 parts by weight and 0.15 parts by weight, respectively, relative to 100 parts by weight of the solid content of the copolymer (A).

Comparative Example 1

A cross-linkable composition was prepared in the same manner as in Example 1, except that the ionic compound and acetylacetone were not applied.

Comparative Example 2

A cross-linkable composition was prepared in the same manner as in Example 1, except that acetylacetone was not combined.

Comparative Example 3

A cross-linkable composition was prepared in the same manner as in Example 2, except that acetylacetone was not combined.

The composition of each of the cross-linkable compositions is summarized in Table 1 below.

TABLE 1

| | Copolymer | Epoxy cross-linking agent | Ionic compound | AcAc |
|---|---|---|---|---|
| Example 1 | 100 | 0.037 | 0.74 | 0.03 |
| Example 2 | 100 | 0.037 | 3.7 | 0.03 |
| Example 3 | 100 | 0.037 | 3.7 | 0.15 |
| Comparative Example 1 | 100 | 0.037 | 0 | 0 |
| Comparative Example 2 | 100 | 0.037 | 0.74 | 0 |
| Comparative Example 3 | 100 | 0.037 | 3.7 | 0 |

Unit: part by weight
Copolymer: copolymer (A) prepared in Preparation Example 1
Epoxy cross-linking agent: T-743L, Soken Co., Japan
Ionic compound: LiTFSI(lithium bis(trifluoromethanesulfonyl imide))
AcAc: acetylacetone The curing rate and surface resistance value measured for each cross-linkable composition are summarized in Table 2 below.

TABLE 2

| | Curing rate (%) | Room temperature surface resistance ($\Omega$/sq) | High temperature surface resistance ($\Omega$/sq) | Moisture-heat surface resistance ($\Omega$/sq) |
|---|---|---|---|---|
| Example 1 | 85.3 | $2.64 \times 10^{11}$ | $5.13 \times 10^{11}$ | $1.47 \times 10^{11}$ |
| Example 2 | 45.5 | $1.08 \times 10^{10}$ | $2.98 \times 10^{10}$ | $7.55 \times 10^{9}$ |

TABLE 2-continued

| | Curing rate (%) | Room temperature surface resistance (Ω/sq) | High temperature surface resistance (Ω/sq) | Moisture-heat surface resistance (Ω/sq) |
|---|---|---|---|---|
| Example 3 | 80 | $9.99 \times 10^9$ | $2.38 \times 10^{10}$ | $7.15 \times 10^9$ |
| Comparative Example 1 | 81.5 | Over Range | Over Range | $1.17 \times 10^{12}$ |
| Comparative Example 2 | 78.9 | $3.14 \times 10^{11}$ | $6.32 \times 10^{11}$ | $1.63 \times 10^{11}$ |
| Comparative Example 3 | 0 | $1.17 \times 10^{10}$ | $2.57 \times 10^{10}$ | $1.08 \times 10^{10}$ |

Over Range: more than measurement performance of measuring equipment

Review of Results

As a result of measuring the curing rate of each of the cross-linkable compositions of Examples 1 to 3 and Comparative Examples 1 to 3 in the above-mentioned manner, Examples 1 to 3 were 85.3%, 45.5% and 80%, respectively, and Comparative Examples 1 to 3 were 81.5%, 78.9% and 0%, respectively.

Among the results, Comparative Example 1 exhibits a high curing rate in the state that the ionic compound is not included, whereas it can be seen that when comparing with the results of Comparative Examples 2 and 3, as the addition amount of the ionic compound is increased, the curing rate is decreased. Accordingly, it can be confirmed that the ionic compound causes a decrease in the cross-linking efficiency and in particular, when a considerable amount of the ionic compound is combined as in Comparative Example 3, the cross-linking is rarely achieved.

However, it can be confirmed that when the acetylacetone corresponding to the compound of Formula 1 is combined in the same composition as those of Comparative Examples 2 and 3 above (Examples 1 to 3), the curing rate is greatly increased.

These results can also be verified by NMR measurement, which will be described with reference to the FIGURE as follows.

In the FIGURE, the lowermost NMR result is the result measured after LiTFSI, which is an ionic compound used in Examples and Comparative Examples, is solely dissolved in a solvent of ethyl acetate, and the uppermost NMR is the result measured by combining the same epoxy cross-linking agent as applied in Examples and Comparative Examples.

Comparing the two results, it can be seen that if the epoxy cross-linking agent is added to LiTFSI, the peak shifts to a down field. In the FIGURE, the second NMR from the top is the case where acetylacetone is added to a solution containing LiTFSI and the epoxy cross-linking agent so that the volume ratio thereof to the epoxy cross-linking agent is 1:0.25 (epoxy cross-linking agent: acetylacetone), and the third NMR is the result measured after being added so that the volume ratio is about 1:0.5 (epoxy cross-linking agent: acetylacetone). Through the drawing, it can be confirmed that as acetylacetone is added, the peak again shifts to an upfield. Accordingly, it can be confirmed that the phenomenon of interfering with the cross-linking reaction is solved through interaction of LiTFSI with acetylacetone.

The invention claimed is:

1. An optical laminate comprising an optical film; and a pressure-sensitive adhesive layer formed on one side of the optical film and including a cross-linked product of a cross-linkable composition,
the optical film comprising a polyvinyl alcohol polarizer, in which the polyvinyl alcohol polarizer comprising a potassium component and a zinc component, and a ratio of the potassium component to the zinc component is in a range of 0.2 to 6,
the cross-linkable composition comprising an acrylic polymer having a carboxyl group; an ionic compound containing an alkali metal cation; a compound of Formula 1 below; and an epoxy cross-linking agent,

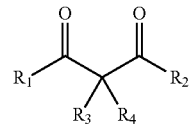

[Formula 1]

wherein,
$R_1$ and $R_2$ are each independently an alkyl group having 1 to 4 carbon atoms, $R_3$ and $R_4$ are each independently a hydrogen atom;
the cross-linkable composition does not comprise a metal chelate cross-linking agent and a metal-containing cross-linking catalyst;
the acrylic polymer comprises a polymerized unit of an alkyl (meth)acrylate monomer and a polymerized unit of a carboxyl group-containing monomer;
the carboxyl group-containing monomer is 2-(meth)acryloyloxyacetic acid, 3-(meth)acryloyloxypropyl acid, 4-(meth) acryloyloxybutyric acid, an acrylic acid dimer, itaconic acid, maleic acid, or maleic anhydride.

2. The optical laminate according to claim 1, wherein the alkali metal cation is a lithium cation.

3. The optical laminate according to claim 1, wherein the ionic compound comprises an anion of Formula 2 below:

[Formula 2]

wherein, X is nitrogen or carbon, Y is carbon or sulfur, $R_f$ is a perfluoroalkyl group, in is 1 or 2, and n is 2 or 3.

4. The optical laminate according to claim 1, wherein the ionic compound is any one anion of Formulas 3 to 5 below:

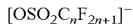

[Formula 3]

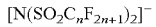

[Formula 4]

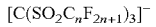

[Formula 5]

wherein, n of formula 4 is a number in a range of 0 to 4, n of formula 3 and formula 5 is a number in a range of 1 to 4.

5. The optical laminate according to claim 1, wherein the ionic compound is in an amount of 0.001 to 20 parts by weight relative to 100 parts by weight of the acrylic polymer.

6. The optical laminate according to claim 1, wherein the ionic compound is in an amount of 3 parts by weight or more relative to 100 parts by weight of the acrylic polymer.

7. The optical laminate according to claim 1, wherein the compound of Formula 1 is in amount of 0.01 to 30 parts by weight relative to 100 parts by weight of the ionic compound.

8. The optical laminate according to claim 1, wherein the epoxy cross-linking agent is in amount of 10 parts by weight or less relative to 100 parts by weight of the acrylic polymer.

9. The optical laminate according to claim 8, wherein the cross-linking agent is in amount of 1 part by weight or less relative to 100 parts by weight of the acrylic polymer.

10. A display device comprising a display panel to which the optical laminate of claim 1 is attached via the pressure-sensitive adhesive layer.

11. The optical laminate according to claim 1, wherein the polymerized unit of a carboxyl group-containing monomer is in a range of about 0.01 to 10 parts by weight relative to 100 parts by weight of the polymerized unit of the alkyl (meth)acrylate monomer.

12. The optical laminate according to claim 1, wherein the acrylic polymer further comprises a polymerized unit of an aromatic group-containing monomer represented by the following formula 6:

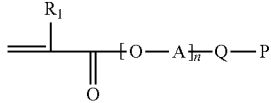

[Formula 6]

in Formula 6, $R_1$ represents hydrogen or an alkyl group, A represents an alkylene group, n represents an integer in a range of 0 to 3, Q represents a single bond, —O—, —S— or an alkylene group, and P represents an aryl group.

13. The optical laminate according to claim 1, wherein the acrylic polymer has a weight-average molecular weight (Mw) of 500,000 or more.

14. An optical laminate comprising an optical film; and a pressure-sensitive adhesive layer formed on one side of the optical film and including a cross-linked product of a cross-linkable composition, the optical film comprising a polyvinyl alcohol polarizer, in which the polyvinyl alcohol polarizer comprising a potassium component and a zinc component, and a ratio of the potassium component to the zinc component is in a range of 0.2 to 6, the cross-linkable composition comprising an acrylic polymer having a carboxyl group; an ionic compound containing an alkali metal cation; a compound of Formula 1 below; and an epoxy cross-inking agent,

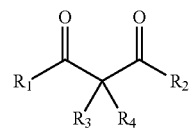

[Formula 1]

wherein, $R_1$ and $R_2$ are each independently an alkyl group having 1 to 4 carbon atoms, $R_3$ and $R_4$ are each independently a hydrogen atom;

the cross-inkable composition does not comprise a metal chelate cross-linking agent and a metal-containing cross-linking catalyst;

the acrylic polymer comprises a polymerized unit of an alkyl (meth)acrylate monomer and a polymerized unit of a carboxyl group-containing monomer;

the carboxyl group-containing monomer is 2-(meth)acryloyloxyacetic acid, 3-(meth)acryloyloxypropyl acid, 4-(meth) acryloyloxybutyric acid, an acrylic acid dimer, itaconic acid, maleic acid, or maleic anhydride;

wherein the ionic compound is in an amount of 3 parts by weight or more relative to 100 parts by weight of the acrylic polymer;

wherein the polymerized unit of the carboxyl group-containing monomer is in a range of about 0.01 to 10 parts by weight relative to 100 parts by weight of the polymerized unit of the alkyl (meth)acrylate monomer.

* * * * *